United States Patent
Horiuchi et al.

(10) Patent No.: US 11,675,230 B2
(45) Date of Patent: Jun. 13, 2023

(54) BACKLIGHT (71) Applicant: NICHIA CORPORATION, Tokushima (JP)

(72) Inventors: Takuma Horiuchi, Yamanashi-ken (JP); Takumi Miyashita, Yamanashi-ken (JP); Kiyokazu Watanabe, Yamanashi-ken (JP)

(73) Assignee: NICHIA CORPORATION, Tokushima (JP)

( * ) Notice: Subject to any disclaimer, the term of this patent is extended or adjusted under 35 U.S.C. 154(b) by 0 days.

(21) Appl. No.: 17/971,040

(22) Filed: Oct. 21, 2022

(65) Prior Publication Data
US 2023/0044687 A1 Feb. 9, 2023

Related U.S. Application Data (60) Division of application No. 17/329,682, filed on May 25, 2021, now Pat. No. 11,506,935, which is a (Continued)

(30) Foreign Application Priority Data

Apr. 26, 2017 (JP) ................. 2017-086726

(51) Int. Cl.
*G02F 1/133* (2006.01)
*G02F 1/13357* (2006.01)

(52) U.S. Cl.
CPC .. *G02F 1/133606* (2013.01); *G02F 1/133603* (2013.01); *G02F 1/133605* (2013.01)

(58) Field of Classification Search
CPC ................................................ G02F 1/133603
(Continued)

(56) References Cited

U.S. PATENT DOCUMENTS

2005/0138852 A1* 6/2005 Yamauchi ............... F21V 17/04
257/E33.071
2006/0256256 A1 11/2006 Seong et al.
(Continued)

FOREIGN PATENT DOCUMENTS

CN 1862343 11/2006
CN 201138407 10/2008
(Continued)

OTHER PUBLICATIONS

International Search Report dated Jul. 3, 2018 in International (PCT) Application No. PCT/JP2018/016428.
(Continued)

*Primary Examiner* — Christopher M Raabe
(74) *Attorney, Agent, or Firm* — Wenderoth, Lind & Ponack, L.L.P.

(57) ABSTRACT

To provide a backlight that reduces the number of LEDs used while facilitating the attempt to make the backlight smaller in thickness. On a mount substrate (11), LEDs (13) are mounted in a square lattice arrangement. Over a portion near the center of each unit of the square lattice, protrusions (15) of a diffusion plate (14) are disposed. Among light emitted from the LEDs (13), light traveling in lateral directions between the mount substrate (11) and the diffusion plate (14) is captured by the protrusions (15). The captured light is refracted and reflected by the interfaces of the protrusions (15), and diffused due to diffusing particles, with the result that the light is turned into upward illumination light.

10 Claims, 8 Drawing Sheets

Related U.S. Application Data continuation of application No. 16/603,610, filed as application No. PCT/JP2018/016428 on Apr. 23, 2018, now Pat. No. 11,054,700.

(58) Field of Classification Search
USPC .......................................................... 362/97.1
See application file for complete search history.

(56) References Cited

U.S. PATENT DOCUMENTS

| | | | |
|---|---|---|---|
| 2008/0303411 | A1 | 12/2008 | Ohta et al. |
| 2010/0188613 | A1 | 7/2010 | Tsukahara |
| 2011/0037740 | A1 | 2/2011 | Yamaguchi |
| 2011/0149594 | A1 | 6/2011 | Terajima et al. |
| 2012/0013811 | A1 | 1/2012 | Shimizu |
| 2014/0009837 | A1 | 1/2014 | Liu et al. |
| 2014/0226312 | A1 | 8/2014 | Park et al. |
| 2014/0321127 | A1* | 10/2014 | Chang ............... G02F 1/133605 362/308 |
| 2015/0293405 | A1 | 10/2015 | Park |
| 2015/0346551 | A1 | 12/2015 | Sun et al. |
| 2018/0036997 | A1 | 2/2018 | Shimizu |
| 2018/0299731 | A1 | 10/2018 | Kyoukane |
| 2019/0049651 | A1 | 2/2019 | Yamamoto |
| 2019/0271884 | A1 | 9/2019 | Watanabe |
| 2019/0294005 | A1 | 9/2019 | Imada et al. |
| 2021/0018798 | A1 | 1/2021 | Kobayashi |

FOREIGN PATENT DOCUMENTS

| | | |
|---|---|---|
| CN | 103150967 | 6/2013 |
| CN | 103712128 | 4/2014 |
| CN | 103782227 | 5/2014 |
| CN | 104267539 | 1/2015 |
| EP | 1 722 267 | 11/2006 |
| JP | 2005-149942 | 6/2005 |
| JP | 2007-95674 | 4/2007 |
| JP | 2013-115280 | 6/2013 |
| TW | M277952 | 10/2005 |
| WO | 2016/175111 | 11/2016 |

OTHER PUBLICATIONS

Translation of International Preliminary Report on Patentability dated Sep. 4, 2019 in International (PCT) Application No. PCT/JP2018/016428.
Office Action dated Aug. 24, 2021 in corresponding Chinese Patent Application No. 201880025436.2 with English translation.
Office Action dated Dec. 22, 2021 in U.S. Appl. No. 17/329,682.
Office Action dated May 19, 2022 in U.S. Appl. No. 17/329,682.
Notice of Allowance dated Sep. 7, 2022 in U.S. Appl. No. 17/329,682.

* cited by examiner

BACKLIGHT

TECHNICAL FIELD

The present application relates to a direct type backlight that uses a plurality of LEDs arranged in a matrix to illuminate a transmission-type display device, such as a liquid crystal panel, from a rear surface of the display device.

RELATED ART

In liquid crystal display devices, an image displayed on a screen of the liquid crystal display device is viewed directly. For this purpose, a backlight is generally used to radiate diffused light from a rear surface of a liquid crystal panel of the liquid crystal display device. Backlights are roughly divided into: direct type backlights, in which a light source is disposed on the rear surface of the liquid crystal panel; and side-edge backlights, in which a light-guiding plate is disposed on the rear surface of the liquid crystal panel and a light source is disposed on a side surface of the liquid crystal panel. In a direct type backlight, the light source is covered by a diffusion plate so that uniform diffused light is radiated from the diffusion plate toward the liquid crystal panel. In a side-edge backlight, light incident on the light-guiding plate from the light source is radiated toward the liquid crystal panel from the main surface of the light-guiding plate opposed to the rear surface of the liquid crystal panel.

Direct type backlights are easy to make enlarge in area and, as such, used in many cases in liquid crystal televisions and other appliances that are equipped with large-size liquid crystal panels. Side-edge backlights, in contrast, are easy to make small in thickness and, as such, used in many cases in mobile phones and other appliances that are equipped with middle to small-size liquid crystal panels. Recently, however, much attention has been given to application of local lighting control (hereinafter occasionally referred to as "local dimming"), which is well performed by direct type backlights, to car navigation systems that use middle to small-size liquid crystal panels, for the purpose of improving image quality.

In order to apply direct type backlights to display devices equipped with middle to small-size liquid crystal panels, it is necessary to make the direct type backlights smaller in thickness. Smaller-thickness direct type backlights, however, make uneven luminance more noticeable. Specifically, portions immediately over light source LEDs are brightly illuminated, whereas portions over intermediate portions between the LEDs are dimly illuminated. In view of such uneven luminance, patent document 1, for example, recites a display device in which depressions are provided on one surface of the diffusion plate to reduce uneven luminance.

RELATED ART DOCUMENTS

Patent Documents

[Patent document 1] JP 2007-95674A (FIG. 10).

SUMMARY OF THE INVENTION

Problems to be Solved by the Invention

Patent document 1 recites that with depressions provided on the portions immediately over the LEDs, the diffusion plate covering the LEDs refracts light beams emitted in diagonally upward directions from the LEDs, thereby compensating for the dim portions between the LEDs. LEDs, however, have a high light distribution in directions immediately over the LEDs. Under the circumstances, when depressions are provided to refract light existing in directions immediately over the LEDs so as to compensate for the dim portions between the LEDs, it is impossible to increase the distances between adjacent LEDs. In other words, in a backlight in which depressions are provided on the diffusion plate to reduce uneven luminance, it is necessary to densely arrange LEDs. This increases the number of LEDs used in the backlight, resulting in an increase in mounting load.

The invention disclosed in the present application has been made in view of the above-described problems, and has an object to provide a thin direct type backlight that uses a smaller number of LEDs.

Means of Solving the Problems

In order to solve the above-described problem, a backlight according to the present disclosure includes a mount substrate; a plurality of LEDs mounted on the mount substrate; and a diffusion plate covering the plurality of LEDs with a gap provided between the diffusion plate and the plurality of LEDs. The diffusion plate has a flat portion and a plurality of protrusions on a lower surface of the diffusion plate. The flat portion is disposed over the plurality of LEDs, and the plurality of protrusions are disposed over respective intermediate portions disposed between the plurality of LEDs.

In the backlight according to the present disclosure, the plurality of LEDs may be mounted on the mount substrate such that units each made up of three or more of the LEDs are repeatedly arranged, and at least one of the plurality of protrusions may be disposed over a portion near a center of each unit of the units. In the backlight according to the present disclosure, one or more of the plurality of protrusions may be disposed over the portion near the center of the each unit, and a rest of the plurality of protrusions may be disposed over an intermediate portion disposed between adjacent two LEDs of the each unit.

In the back light according to the present disclosure, an area of the flat portion is preferably larger than an area of a region in which the plurality of protrusions are disposed. In the backlight according to the present disclosure, the diffusion plate may include a plurality of diffusion plate pieces divided in a plane direction. In the backlight according to the present disclosure, the diffusion plate may include: a transparent member; and a thin planar diffusion member disposed on the transparent member, and the transparent member may include: a thin planar base; and the plurality of protrusions disposed on a lower surface of the base.

In the backlight according to the present disclosure, the transparent member may include a plurality of transparent member pieces divided in a plane direction. In the backlight according to the present disclosure, the plurality of protrusions may be attached to the base. In the backlight according to the present disclosure, the plurality of LEDs each may have a rectangular column shape, and a generating line defined as a boundary between side surfaces of one LED of the LEDs may be opposed to a generating line defined as a boundary between side surfaces of another LED of the LEDs adjacent to the one LED. In the backlight according to the present disclosure, at least one of the plurality of protrusions may have a polyhedral cone shape.

In the backlight according to the present disclosure, a leading end of at least one of the plurality of protrusions may be disposed near an upper surface of the mount substrate. In the backlight according to the present disclosure, at least one of the plurality of protrusions may penetrate the mount substrate. In the backlight according to the present disclosure, the at least one of the plurality of protrusions penetrating the mount substrate may be fixed to the mount substrate by caulking. In the backlight according to the present disclosure, at least one of the plurality of LEDs may include a semi-transmission reflecting layer on an upper surface of the at least one of the plurality of LEDs.

Effects of the Invention

Between the diffusion plate and the mount substrate, there is light traveling in lateral directions. Such light makes substantially no contribution to the luminance of the backlight without a plurality of protrusions. The backlight according to the present disclosure captures such light using a plurality of protrusions and directs the light upward. That is, even if there is a large distance between adjacent LEDs, laterally traveling light, which has not hitherto been made use of, overcomes the occurrence of dimness in the portion between LEDs. As a result, the backlight according to the present disclosure reduces the number of LEDs used while facilitating the attempt to make the backlight smaller in thickness.

MODES FOR CARRYING OUT THE INVENTION

By referring to the accompanying drawings, preferred embodiments of the present application will be described in detail below. It is to be noted that the accompanying drawings illustrate schematic representations of the backlight, components of the backlight, and peripheral members of the backlight. That is, actual dimensions and proportions of these members may not necessarily be identical to the dimensions and proportions illustrated in the accompanying drawings. For convenience of description, in the present application, directions will be described as upward, downward, right, and left based on the orientation of the backlight illustrated in FIG. 4, unless noted otherwise. Also, redundant descriptions will be avoided, and identical members may be assigned identical signs and or symbols.

First Embodiment

Figure 1:
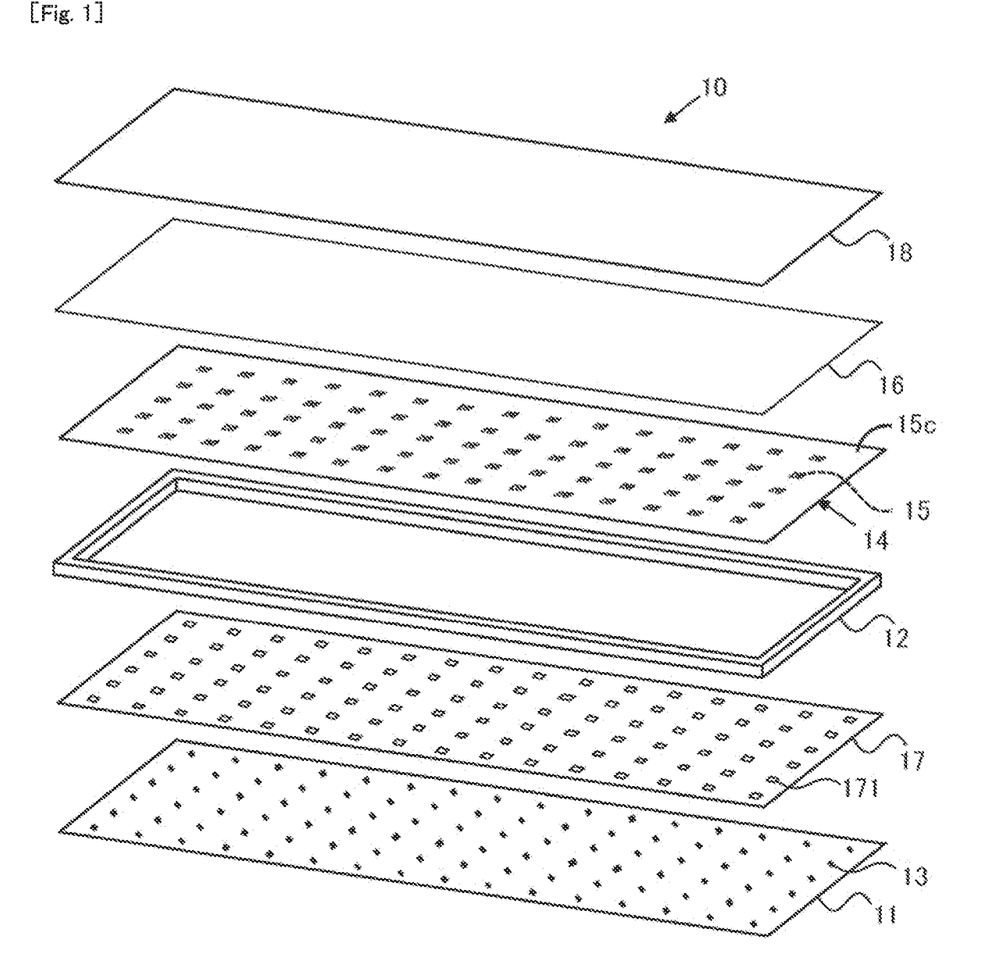
FIG. 1 is an exploded perspective view of a backlight described as a first embodiment of the present application.

FIG. 1 is an exploded perspective view of a backlight 10 described as the first embodiment of the present application. As illustrated in FIG. 1, the backlight 10 includes a mount substrate 11, a plurality of LEDs 13, a reflecting sheet 17, a resin frame 12, a diffusion plate 14, a prism sheet 16, and a reflection-type polarizing plate 18. The reflecting sheet 17, the resin frame 12, the diffusion plate 14, the prism sheet 16, and the reflection-type polarizing plate 18 are laminated on top of each other in this order in the upward direction on the mount substrate 11.

The mount substrate 11 has a thickness of 1 mm and is made of a base material such as metal, ceramic, and resin having high thermal conductivity. The base material is insulation-processed on the surface. On the mount substrate 11, wires (not illustrated) are formed for performing lighting control of the LEDs 13 individually or on a group basis to implement local dimming. The plurality of LEDs 13 each have a square column shape, which is one of polyhedral column shapes, and are mounted in a matrix on the upper surface of the mount substrate 11. It is to be noted that the shape of each LED 13 may be a circular column shape or a quadrangular column shape having a rectangular bottom surface.

The reflecting sheet 17 is made of a white-color resin having a thickness of 0.188 mm. On the reflecting sheet 17, holes 171 are disposed at positions corresponding to the respective LEDs 13. When the reflecting sheet 17 is laminated on the mount substrate 11 on which the LEDs 13 are mounted, upper portions of the LEDs 13 pass through the respective holes 171 and protrude beyond the reflecting sheet 17. The resin frame 12 is a frame structure made of a white-color resin having a thickness of 5.5 mm. The resin frame 12 is mounted on the mount substrate 11.

The diffusion plate 14 cover the plurality of LEDs 13. The resin frame 12 defines a gap between the diffusion plate 14 and the LEDs 13. The diffusion plate 14 is made of a semi-transparent resin having a thickness of approximately 1 mm, examples including a polycarbonate mixed with a dispersing agent. The diffusion plate 14 includes: a planar portion 15c, which includes a flat portion 15b on the lower surface of the planar portion 15c; and a plurality of protrusions 15, which are formed on the lower surface of the planar portion 15c. The protrusions 15 may be integral to the planar portion 15c or may be a separate structure non-integral to the planar portion 15c. In this embodiment, the protrusions 15 and the planar portion 15c are integrally formed by injection molding. Also, the protrusions 15 are arranged in a matrix.

The diffusion plate 14 has such a configuration that the flat portion 15b is disposed over the plurality of LEDs 13 and that the plurality of protrusions 15 are disposed over intermediate portions disposed between the plurality of LEDs 13. This ensures that among light emitted from the LEDs 13, light traveling in lateral directions between the mount substrate 11 and the diffusion plate 14 is captured by the protrusions 15. Then, the lateral light captured by the protrusions 15 is refracted and reflected by the interfaces of the protrusions 15, and diffused due to diffusing particles, with the result that the light is turned into upward illumination light.

Specifically, in the backlight 10, light travels in lateral directions between the diffusion plate 14 and the mount substrate 11 and is captured by the protrusions 15 in a region that would be a dim portion without the protrusions 15. Then, the light is emitted in the upward direction. As a result, light emitting efficiency improves. Also, the backlight 10 enhances the component of the laterally traveling light, resulting in minimized uneven luminance. As a result, the backlight 10 has improved light emitting efficiency while facilitating the attempt to make the backlight 10 smaller in thickness. This increases the pitch of the LEDs 13 in the backlight 10, reducing the number of the LEDs 13 used.

The prism sheet 16 is made of a transparent resin having a thickness of 0.155 mm, and fine prisms are formed on the upper surface of the prism sheet 16. These fine prisms adjust the light distribution of the LEDs 13. The reflection-type polarizing plate 18 has such a structure that resin films each having a thickness of 0.390 mm are laminated on top of each other. The reflection-type polarizing plate 18 permits polarized light having a component in one direction to be transmitted through the reflection-type polarizing plate 18 while reflecting other light components, thereby performing light recycling.

Figure 2:
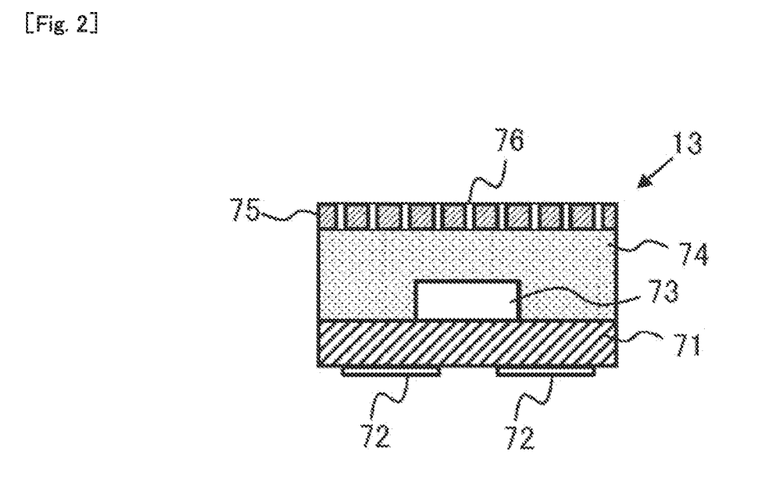
FIG. 2 is a cross-sectional view of an LED included in the backlight illustrated in FIG. 1.

FIG. 2 is a cross-sectional view of an LED 13 included in the backlight 10. As illustrated in FIG. 2, the LED 13 is such a packaged product that an LED die 73 is mounted on a sub-mount substrate 71 and sealed with a fluorescent resin 74. The sub-mount substrate 71 includes connection electrodes 72 on the lower surface of the sub-mount substrate 71. The connection electrodes 72 are connected by soldering to the wires formed on the upper surface of the mount substrate 11. Electrodes (not illustrated) of the LED die 73 are electrically connected by flip chip mounting or wire bonding to electrodes (not illustrated) formed on the upper surface of the sub-mount substrate 71. On the upper surface of the fluorescent resin 74, a metal reflecting layer 75 is formed. The metal reflecting layer 75 is a semi-transmission reflecting layer. The metal reflecting layer 75 includes a plurality of through holes 76.

Figure 3:
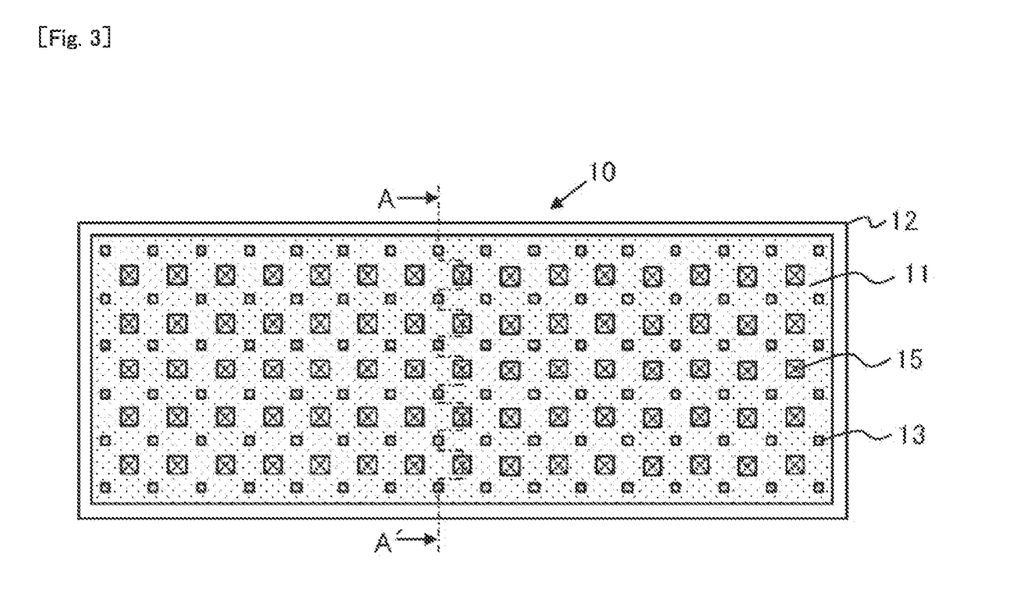
FIG. 3 is a plan view of the backlight illustrated in FIG. 1.

FIG. 3 is a plan view of the backlight 10. In FIG. 3, to clearly illustrate the structure of a portion of the backlight 10 at and lower than the diffusion plate 14, illustration of the reflection-type polarizing plate 18, the prism sheet 16, and the reflecting sheet 17 is omitted, and further, the diffusion plate 14 and the planar portion 15c are illustrated as transparent. As illustrated in FIG. 3, the LEDs 13 are mounted in a square lattice arrangement. The pitch of the LEDs 13 is 18 mm. Also, the protrusions 15 are disposed in a square lattice arrangement. In the backlight 10, the plurality of LEDs 13 are mounted on the mount substrate 11 such that square units each made up of four adjacent LEDs 13 are repeatedly arranged.

Over a portion near the center of each unit, one protrusion 15 is disposed. The protrusion 15 may have: a circular cone shape; a polyhedral cone shape such as a triangular cone shape and a quadrangular cone shape; a circular column shape; or a dome shape. When the protrusion 15 has a circular cone shape, a circular column shape, or a dome shape, a dim portion at the center of the unit is compensated for in a circular form. In contrast, when the protrusion 15 has a square cone shape, the dim portion at the center of the unit is compensated for in a square form. As in this embodiment, when the LEDs 13 are aligned in a square lattice arrangement, a square dim portion is more likely to occur. In view of this, in this embodiment, the protrusion 15 may preferably have a square cone shape in some cases.

The protrusion 15 has a square cone shape pointed downward. In FIG. 3, boundaries between the side surfaces of the square cone are indicated by dotted lines. The arrangement of the LEDs 13 and the protrusion 15 will not be limited to this embodiment. The plurality of LEDs 13 may be mounted on the mount substrate 11 such that units each made up of three or more LEDs 13 are repeatedly arranged with at least one of the plurality of protrusions 15 disposed over a portion near the center of each unit. The shape of each unit will not be limited to a square shape, other examples including a circular shape, a triangular shape, a rectangular shape, a hexagonal shape, and an octagonal shape.

Figure 4:
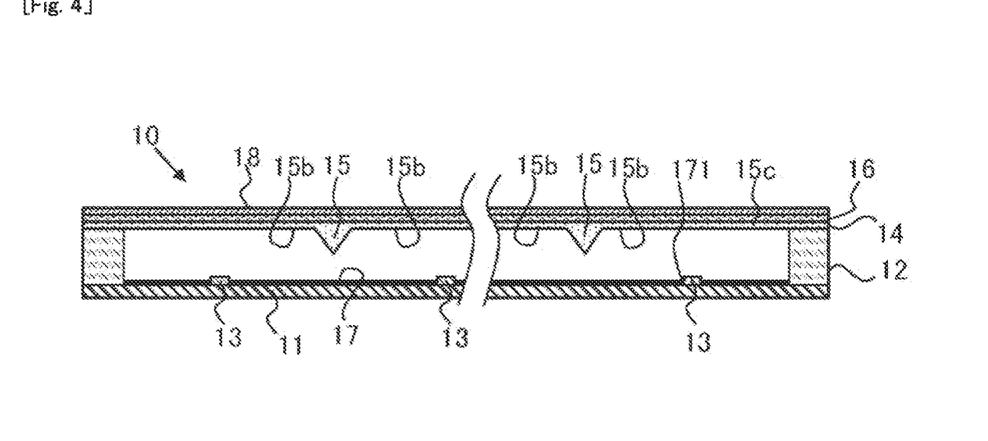
FIG. 4 is a cross-sectional view the backlight illustrated in FIG. 1.

FIG. 4 is a cross-sectional view of the backlight 10 taken along the A-A' line illustrated in FIG. 3. As illustrated in FIG. 4, the reflecting sheet 17 is adhered to the mount substrate 11. Also, the plurality of LEDs 13 are mounted on the mount substrate 11. Upper portions of the LEDs 13 protrude through holes 171 of the reflecting sheet 17. Since each protrusion 15 has a square cone shape, the shape of the protrusion 15 in FIG. 4 is a triangular shape. It is to be noted that the A-A' line is a rectangular waveform zigzag line, and thus the protrusion 15 exists immediately over an intermediate portion disposed between two adjacent LEDs 13 in FIG. 4. On the diffusion plate 14, the prism sheet 16 and the reflection-type polarizing plate 18 are laminated.

The thickness of the protrusion 15 as measured from the flat portion 15b, that is, the height of the protrusion 15 protruding downward from the planar portion 15c is 3 mm. The shape of the bottom surface of the protrusion 15 is a 4 mm by 4 mm square. The resin frame 12 is adhered to the mount substrate 11. The diffusion plate 14, the prism sheet 16, and the reflection-type polarizing plate 18 are laminated, not adhered, on top of each other via air layers to avoid optically close contact. The backlight 10 is housed in a case (not illustrated). The diffusion plate 14, the prism sheet 16, and the reflection-type polarizing plate 18 are supported by and fixed to the case.

Figure 5:
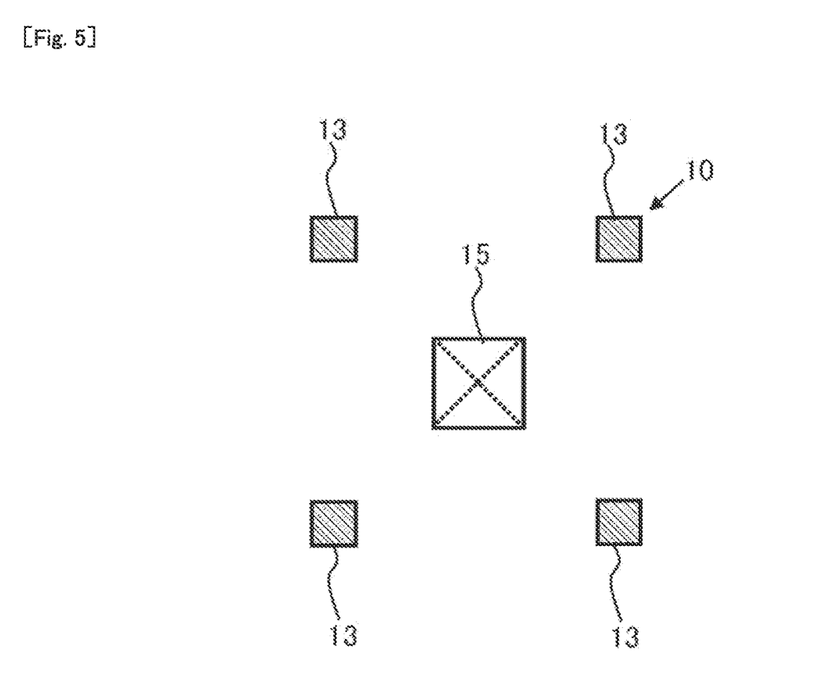
FIG. 5 is an enlarged view of part of the plan view illustrated in FIG. 3.

FIG. 5 is a plan view of one unit, made up of four LEDs 13, taken from the backlight 10 illustrated in FIG. 3, with only the LEDs 13 and the protrusion 15 of the unit being illustrated. The unit serves as a repetition unit of the square lattice arrangement of the LEDs 13, and is made up of four LEDs 13. More precisely, four one-fourths of LED 13 make up a single unit, considering that one LED 13 also makes up part of adjacent other units. Over a portion near the center of each unit, the protrusion 15 is disposed.

Figure 6:
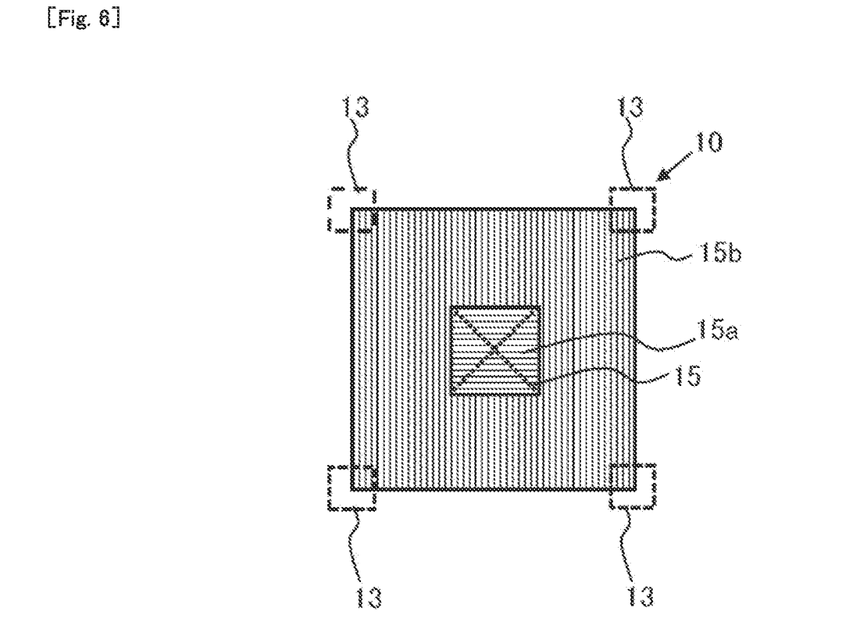
FIG. 6 is another enlarged view of the part of the plan view illustrated in FIG. 3.

FIG. 6 is another plan view of the unit illustrating the unit in a manner different from the plan view illustrated in FIG. 5. FIG. 6 illustrates: the flat portion 15b, which is a flat portion on the lower surface of the planar portion 15c; and a region 15a, in which the protrusion 15 is disposed on the lower surface of the planar portion 15c. It is to be noted that the LEDs 13 are indicated by broken lines. The area of the region 15a is 4 mm×4 mm=16 mm², and the area of the flat portion 15b is 18 mm×18 mm−4 mm×4 mm=308 mm². That is, the area of the flat portion 15b is larger than the area of the region 15a, in which the plurality of protrusions 15 are disposed.

In the backlight recited in patent document 1, depressions on the diffusion plate are disposed immediately over the LEDs, and there is most no flat portion corresponding to the flat portion 15b. Thus, the large-small relationship in the backlight 10 between the area of the flat portion 15b and the area of the region 15a, in which the plurality of protrusions 15 are disposed, is clearly different from the large-small relationship of the areas in the backlight recited in patent document 1. Also, the large-small relationship in the back light 10 between the areas can be regarded as an indication that there is a sufficiently large flat portion 15b existing between one protrusion 15 and another protrusion 15 adjacent the one protrusion 15. In the backlight 10, light travels between the mount substrate 11 and the diffusion plate 14 while being repeatedly reflected, and would become stray light without the protrusions 15. Since, however, there is a long distance between adjacent protrusions 15, the light is converted by the protrusion 15 into illumination light. Thus, as seen from FIGS. 5 and 6 as well, the LEDs 13 can be arranged at a distance from each other in the backlight 10.

Most of the upward light emitted from the LED die 73 is reflected by the metal reflecting layer 75 and emitted beyond the side surfaces of the fluorescent resin 74. The rest of the light that was not reflected by the metal reflecting layer 75 passes through through holes 76 and becomes upward light directed from the flat portion 15b. Thus, the LEDs 13 enhance light emitted in lateral directions. This light is converted by the protrusion 15 into illumination light. In order to enhance light emitted in lateral directions, a wide-angle lens may be disposed on the upper surface of the fluorescent resin 74. The wide-angle lens may preferably have such an upper surface that, for example, has a circular cone shape or is internally concaved in a pyramid shape with a TIR reflection surface formed on the concave surface. Depending on the angle incident on the TIR reflection surface, transmitted light directed upward appears on the TIR reflection surface. That is, in the backlight 10, it is preferable to the LEDs 13, LEDs equipped with wide-angle lens, other LEDs that makes much of upward light directed in lateral directions.

Second Embodiment

As illustrated in FIG. 3, the plan view of the back light 10 according to the first embodiment shows that the sides of the LEDs 13 and the protrusion 15 are parallel to the horizontal axis or the vertical axis of a square lattice. In the backlight according to the present application, however, an individual LED and a protrusion each have some degree of freedom in rotational angle. In light of this, in a backlight 20 according to the second embodiment the present application, the sides of LEDs 23 and protrusions 25 are inclined by 45° relative to the horizontal axis or the vertical axis of the square lattice of the unit, which will be described by referring to FIGS. 7 to 9. In the backlight 20, a protrusion 25, which is part of the plurality of protrusions, is disposed over a portion near the center of the unit. Also, a protrusion 25a is disposed over an intermediate portion disposed between adjacent two LEDs 23. The protrusions 25a is one of the rest of the plurality of protrusions, and has a triangular column shape pointed downward.

Figure 7:
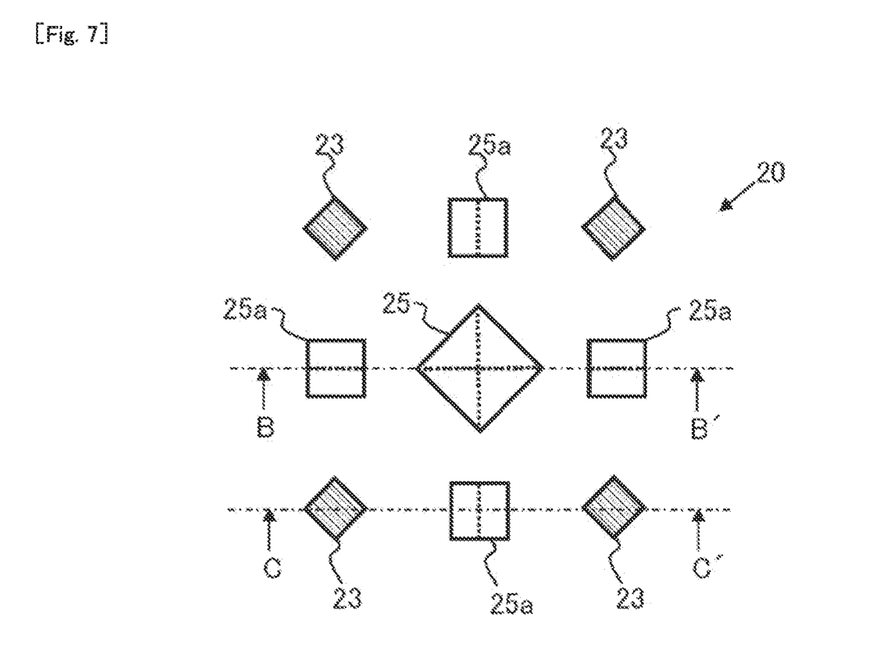
FIG. 7 is a plan view of part of a backlight described as a second embodiment of the present application.

FIG. 7 is a plan view of one unit of the backlight 20 formed in a square lattice defined by four LEDs 23, similarly to FIG. 5. As illustrated in FIG. 7, the backlight 20, similarly to the back light 10, includes a unit made up of four LEDs 23, which are mounted in a square arrangement on a mount substrate 21. Over a portion near the center of the unit, the protrusion 25 is disposed. In the backlight 20, the side surfaces of the LEDs 23 are inclined by 45° relative to the horizontal axis or the vertical axis of the square lattice. That is, a generating line defined as the boundary between side surfaces of one LED 23 is opposed to a generating line defined as the boundary between the side surfaces of another LED 23 adjacent to the one LED 23.

Similarly, the four sides of the bottom surface of each protrusion 25, which has a square cone shape, is inclined by 45° relative to the horizontal axis or the vertical axis of the square lattice. It is to be noted that in FIG. 7, the boundaries between the side surfaces of the square cone shape of each protrusion 25 and the boundaries between the side surfaces of the triangular column shape at the lower end of each protrusion 25a are indicated by dotted lines. The lower ends of the protrusions 25a disposed on the right and left sides of the unit illustrated in FIG. 7 extend in the right and left directions. Also, the lower ends of the protrusions 25a disposed on the upper and lower sides of the unit illustrated in FIG. 7 extend in the vertical direction.

Figure 8:
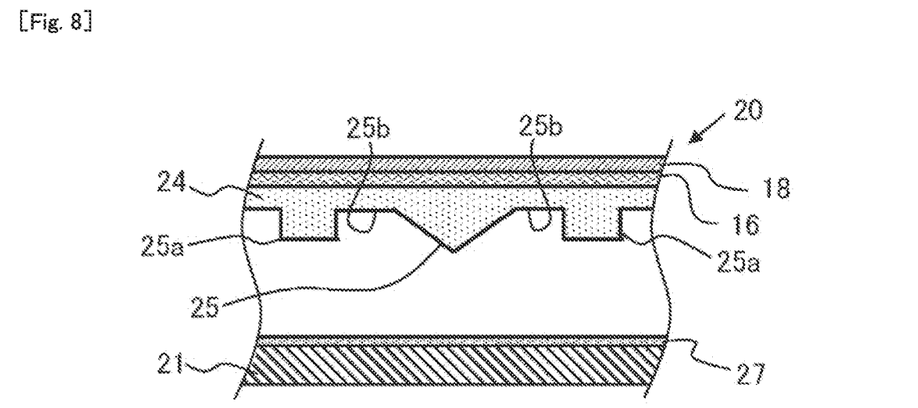
FIG. 8 is a view of a cut end face of part of the back light illustrated in FIG. 7.

FIG. 8 is a view of a cut end face of part of the backlight 20 taken along the B-B' line illustrated in FIG. 7. As illustrated in FIG. 8, a reflecting sheet 27 is laminated on the mount substrate 21, and the prism sheet 16 and the reflection-type polarizing plate 18 are laminated on a diffusion plate 24. The reflecting sheet 27 has a basic configuration identical to the configuration of the reflecting sheet 17 illustrated in FIG. 1. On the lower surface of the diffusion plate 24, the protrusions 25, 25a are disposed. In FIG. 8, the cross-section of the protrusion 25 is a cut surface of a square cone taken along one diagonal line of the bottom surface of the protrusion 25, and is observed as an isosceles triangle having an obtuse apex angle. The cross-section of the protrusion 25a is a cut surface having a triangular column shape cut in the vertical direction from the lower end of the protrusion 25a, and is observed as a rectangle. A flat portion 25b exists between the protrusions 25, 25a.

Figure 9:
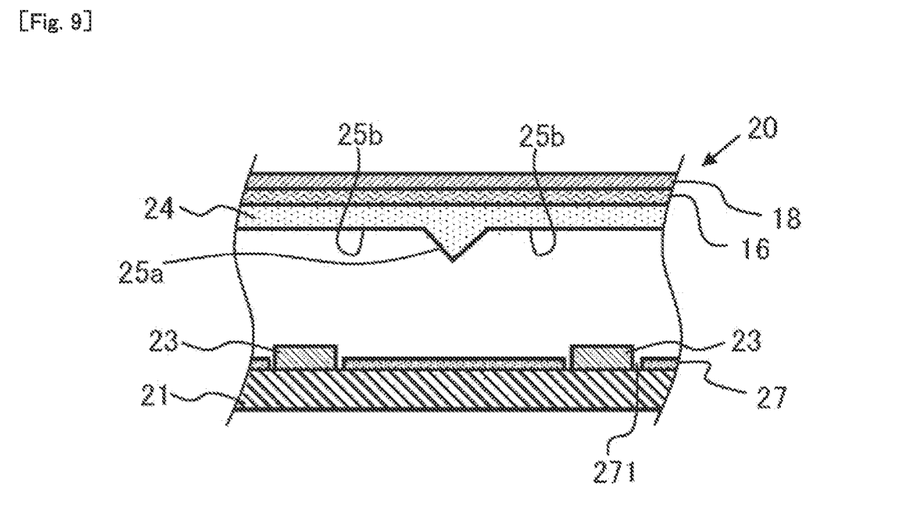
FIG. 9 is another cross-sectional view of a cut end face of the part of the backlight illustrated in FIG. 7.

FIG. 9 is a view of a cut end face of part of the backlight 20 taken along the C-C' line illustrated in FIG. 7. The width of each of holes 271 of the reflecting sheet 27 is slightly greater than the length of the diagonal line on the bottom surface of each of the LEDs 23, as opposed to the width of each of the holes 171 of the reflecting sheet 17 illustrated in FIG. 1. An upper part of each LED 23 protrudes through each hole 271. The cross-section of the protrusion 25a, which is disposed on the lower surface of the diffusion plate 24, is a cut surface having a triangular column shape cut in the vertical direction in such a manner that the cutting is orthogonal to the lower end of the protrusion 25a. The cross-section of the protrusion 25a is observed as an isosceles right triangle. The flat portions 25b exist on both sides of the protrusions 25a.

In the backlight 20, light emitted from one side surface of the LED 23 is directed toward one side surface of the protrusion 25 (see FIG. 7), and thus is more likely to enter the protrusion 25. This ensures that the backlight 20 is more likely to overcome the occurrence of dimness that could occur in the center of the unit of the LEDs 23 if there were no protrusions 25, as compared with the back light 10. Also, the protrusions 25a overcome the occurrence of dimness between adjacent LEDs 23.

Third Embodiment

In the backlights 10, 20, which have been respectively described as the first embodiment and the second embodiment, the lower ends of the protrusions 15, 25 are disposed at positions at a height of 3 mm from the upper surfaces of the mount substrates 11, 21. This height is approximately a half of 5.5 mm, which is the height from the upper surfaces of the mount substrates 11, 21 to the flat portions 15b, 25b of the diffusion plates 14, 24. This, however, is not intended as limiting the position of the lower end of the protrusion. By referring to FIGS. 10 and 11, a backlight 30 according to the third embodiment of the present application will be described. In the backlight 30, the lower end of a protrusion 35, which is its leading end, is disposed near the upper surface of a mount substrate 31.

Figure 10:
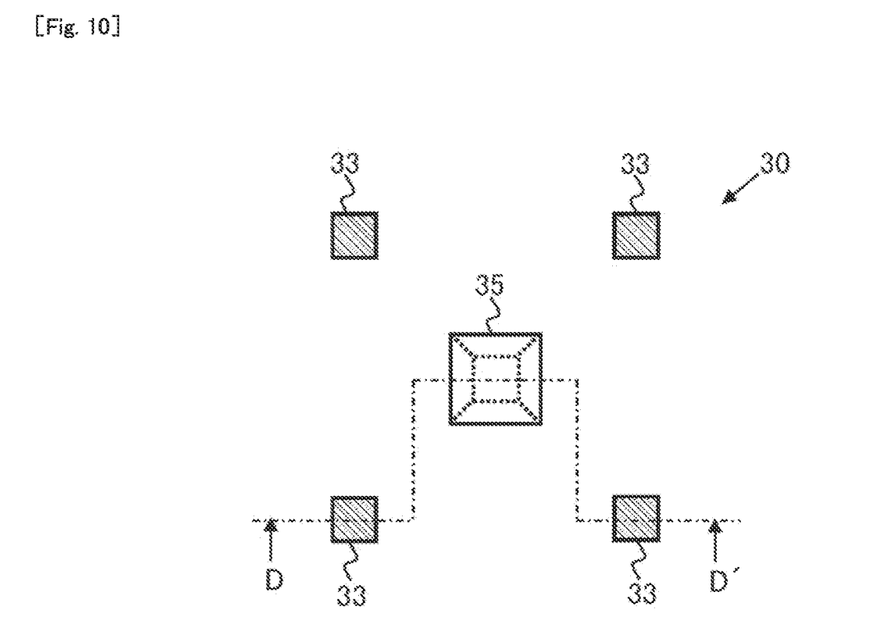
FIG. 10 is a plan view of part of a backlight described as a third embodiment of the present application.

FIG. 10 is a plan view of one unit of the backlight 30 formed in a square lattice defined by four LEDs 33, similarly to FIG. 5. As illustrated in FIG. 10, the backlight 30, similarly to the back light 10, includes a unit made up of four LEDs 33, which are mounted in a square arrangement on the mount substrate 31. Over a portion near the center of the unit, the protrusion 35 is disposed. In the backlight 30, the protrusion 35 has a square cone and trapezoid shape formed by cutting a square cone in parallel with the bottom surface of the protrusion 35 to remove a portion of the square cone including the apex. In FIG. 10, the boundaries between the side surfaces of the square cone portion of the protrusion 35 and the sides of the lower surface of the protrusion 35 are indicated by dotted lines.

Figure 11:
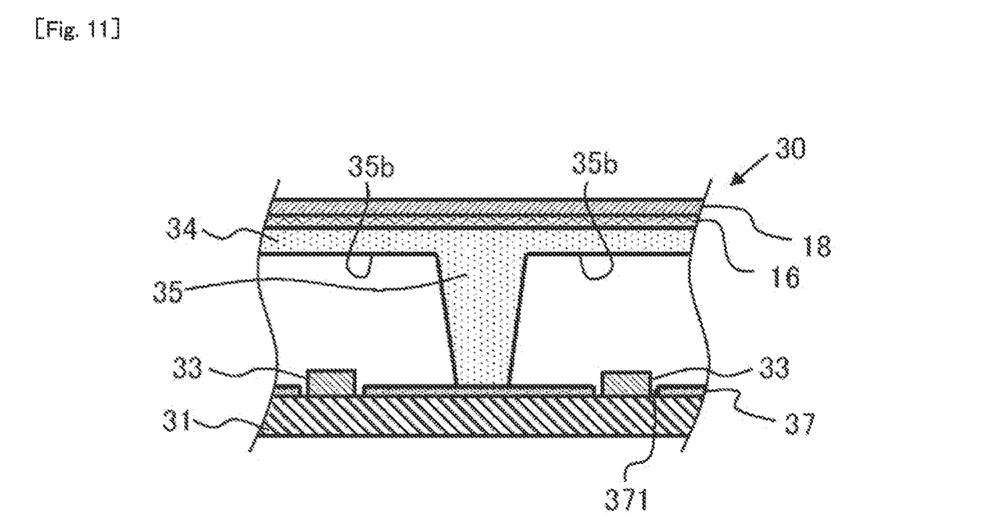
FIG. 11 is a cross-sectional view of the part of the backlight illustrated in FIG. 10.

FIG. 11 is a cross-sectional view of part of the backlight 30 taken along the D-D' line illustrated in FIG. 10. As illustrated in FIG. 11, a reflecting sheet 37 is laminated on the mount substrate 31, and the prism sheet 16 and the reflection-type polarizing plate 18 are laminated on a diffusion plate 34. Upper portions of the LEDs 33 protrude through holes 371 of the reflecting sheet 37. The mount substrate 31 and the reflecting sheet 37 of the backlight 30 are respectively identical to the mount substrate 11 and the reflecting sheet 17 of the backlight 10 illustrated in FIG. 1. On the lower surface of the diffusion plate 34, the protrusion 35 is disposed.

The lower surface of the protrusion 35 is in contact with the reflecting sheet 37. Flat portions 35b exist on both sides of the protrusion 35. The protrusion 35 illustrated in FIG. 11, as described above, captures light propagating in lateral directions between the diffusion plate 34 and the mount substrate 31, and emits the light upward as illumination light. This ensures that the backlight 30 overcomes the occurrence of dimness that could occur in the center of the unit if there were no protrusions 35. Further, the protrusion 35 serves as a column to support the diffusion plate 34, preventing bending of the diffusion plate 34.

Fourth Embodiment

In the backlight 30, which has been described as the third embodiment, the lower end of the protrusion 35 is disposed near the upper surface of the mount substrate 31. The position of the lower end of the protrusion 35, however, has a higher degree of freedom. By referring to FIG. 12, a backlight 40 according to the fourth embodiment of the present application will be described. In the backlight 40, the lower end of the protrusion 35 penetrates the mount substrate. The unit of the backlight 40 is identical in configuration to the unit of the backlight 30 except in the shape of the protrusion 35 and a state indicating how the protrusion 35 is disposed.

Figure 12:
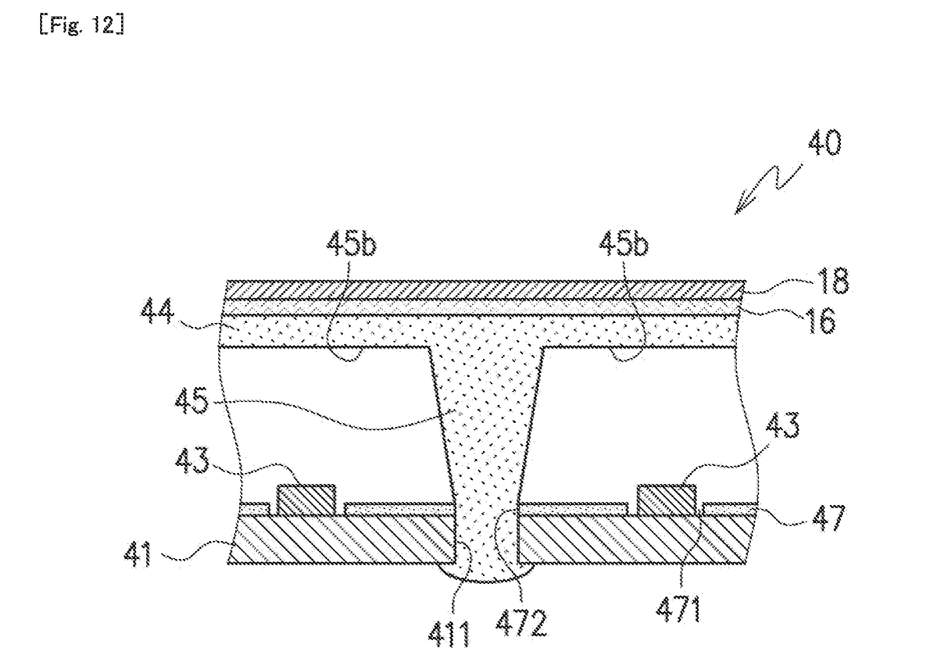
FIG. 12 is a cross-sectional view of part of a backlight described as a fourth embodiment of the present application.

FIG. 12 is a cross-sectional view of part of the backlight 40, similarly to FIG. 11. As illustrated in FIG. 12, a reflecting sheet 47 is laminated on a mount substrate 41, and the prism sheet 16 and the reflection-type polarizing plate 18 are laminated on a diffusion plate 44. Upper portions of LEDs 43 protrude through holes 471 of the reflecting sheet 47. The mount substrate 41 and the reflecting sheet 47 of the backlight 40 are respectively identical to the mount substrate 11 and the reflecting sheet 17 of the back light 10 illustrated in FIG. 1.

A protrusion 45 is disposed on the lower surface of the diffusion plate 44. The protrusion 45 penetrates a hole 472 of the reflecting sheet 47 and a hole 411 of the mount substrate 41. The protrusion 45, which penetrates the mount substrate 41, is fixed to the mount substrate 41 by caulking on the lower surface of the mount substrate 41. This ensures that the protrusion 45 serves as a column to firmly support the diffusion plate 44. Also, the protrusion 45, which is fixed by caulking, keeps the diffusion plate 44 and the LEDs 43 at a uniform distance from each other.

Fifth Embodiment

In the backlights 10, 20, 30, and 40, which have been respectively described as the first to fourth embodiments, the diffusion plates 14, 24, 34, and 44 each have an integrated structure. The diffusion plates, however, will not be limited to an integrated structure. By referring to FIG. 13, a backlight 50 according to the fifth embodiment of the present application will be described. In the backlight 50, a diffusion plate 54 includes a plurality of diffusion plate pieces 54a, which are divided in a plane direction. In this embodiment, the diffusion plate 24 of the back light 20 is divided as an example. The configuration of the backlight 50 is identical to the configuration of the backlight 20 except for the structure of the diffusion plate 54.

Figure 13:
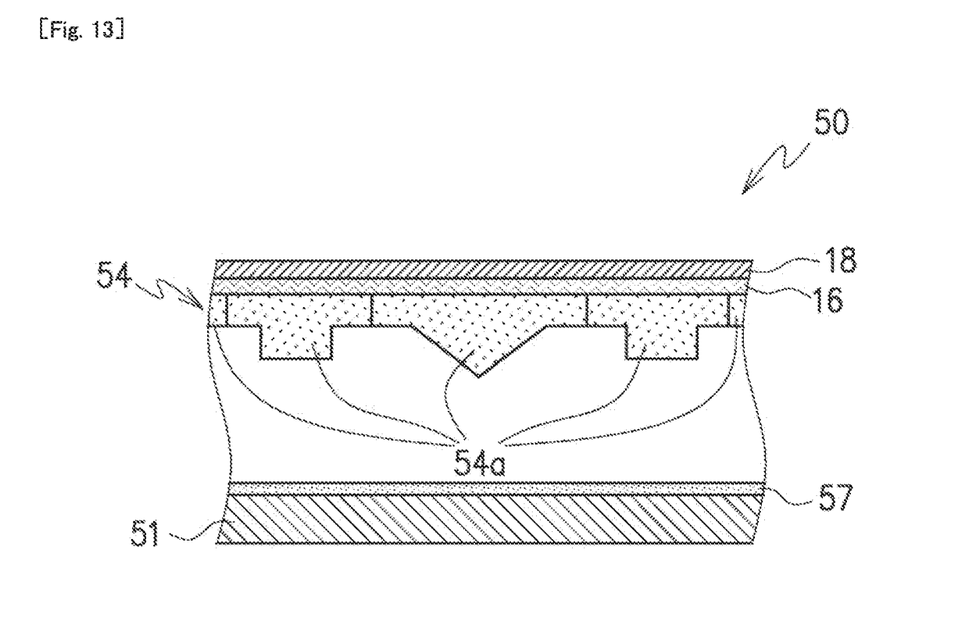
FIG. 13 is a view of a cut end face of part of a backlight described as a fifth embodiment of the present application.

FIG. 13 is a view of a cut end face of part of the backlight 50, similarly to FIG. 8. As illustrated in FIG. 13, a reflecting sheet 57 is laminated on a mount substrate 51, and the prism sheet 16 and the reflection-type polarizing plate 18 are laminated on the diffusion plate 54. The reflecting sheet 57 has a basic configuration identical to the configuration of the reflecting sheet 27 illustrated in FIG. 8. The diffusion plate 54 includes the plurality of diffusion plate pieces 54a. It is to be noted that portions of the diffusion plate 54 to be divided in the plane direction into the plurality of diffusion plate pieces 54a may be set in any desired manner. Also, the diffusion plate 54 may not necessarily be cut on a surface perpendicular to the plane direction of the diffusion plate 54 but may be cut on a surface inclined relative to the plane direction of the diffusion plate 54. In this embodiment, the diffusion plate 54 includes the plurality of diffusion plate pieces 54a. This alleviates heat expansion of the diffusion plate 54, minimizing damage to the backlight 50 caused by generation of heat.

Sixth Embodiment

In the backlight 50, which has been described as the fifth embodiment, the diffusion plate 54 is divided in the plane direction. The division of the diffusion plate, however, will not be limited to the plane direction. By referring to FIG. 14, a backlight 60 according to the sixth embodiment of the present application will be described. In the backlight 60, a diffusion plate 64 is divided in a vertical direction. In this embodiment, the diffusion plate 24 of the backlight 20 is divided in the vertical direction as an example. The configuration of the backlight 60 is identical to the configuration of the backlight 20 except for the structure of the diffusion plate 64.

Figure 14:
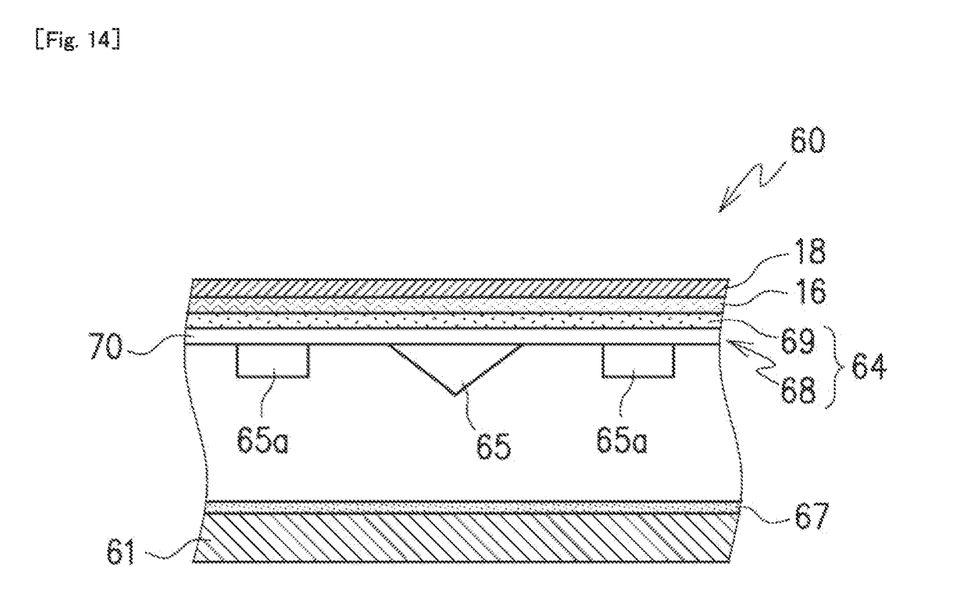
FIG. 14 is a view of a cut end face of part of a backlight described as a sixth embodiment of the present application.

FIG. 14 is a view of a cut end face of part of the backlight 60, similarly to FIG. 8. As illustrated in FIG. 14, a reflecting sheet 67 is laminated on a mount substrate 61, and the prism sheet 16 and the reflection-type polarizing plate 18 are laminated on the diffusion plate 64. The reflecting sheet 67 has a basic configuration identical to the configuration of the reflecting sheet 27 illustrated in FIG. 8. The diffusion plate 64 includes a transparent member 68 and a thin planar diffusion member 69, which is disposed on the transparent member 68. The transparent member 68 is made of, for example, polycarbonate. The diffusion member 69 is made of, for example, a polycarbonate mixed with a dispersing agent. It is also possible to use a transparent dispersing agent so that the diffusion member 69 is made of transparent resin. Further, the transparent member 68 may also contain a transparent dispersing agent. It is to be noted that the diffusion member 69 may be a flexible sheet.

The transparent member 68 includes a thin planar base 70 and protrusions 65, 65a, which are a plurality of protrusions disposed on the lower surface of the base 70. The base 70 and the protrusions 65, 65a may together form an integrated structure. Alternatively, as in this embodiment, the base 70 and the protrusions 65, 65a may be separate structures non-integral to each other such that the protrusions 65, 65a are attached to the base 70 with a double-side tape or other fastening means. In the transparent member 68, the protrusions 65, 65a are attached to the base 70. This makes the transparent member 68 easier to prepare, and makes the transparent member 68 adaptable to various positions of the protrusion 65. Further, the transparent member 68 may include a plurality of transparent member pieces divided in the plane direction. This is because heat expansion of the transparent member 68 is alleviated.

DESCRIPTION OF REFERENCE NUMERALS 10, 20, 30, 40, 50, 60 . . . Backlight
11, 21, 31, 41, 51, 61 . . . Mount substrate
12 . . . Resin frame
13, 23, 33, 43, 53, 63 . . . LED
14, 24, 34, 44, 54, 64 . . . Diffusion plate
15, 25, 25a, 35, 45, 55, 65, 65a . . . Protrusion
15a . . . Protrusion-provided region
15b, 25b, 35b, 45b, 55b, 65b . . . Flat portion
15c . . . Planar portion
16 . . . Prism sheet
17, 27, 37, 47, 57, 67 . . . Reflecting sheet
18 . . . Reflection-type polarizing plate
68 . . . Transparent member
69 . . . Diffusion member
70 . . . Base
71 . . . Sub-mount substrate
72 . . . Connection electrode
73 . . . LED die
74 . . . Fluorescent resin
75 . . . Metal reflecting layer
76 . . . Through hole
171, 271, 371, 411, 471, 472, 571, 771 . . . Hole

What is claimed is:

1. A light source comprising a plurality of LEDs, each of the LEDs including:
    an LED die;
    a fluorescent resin contacting the LED die; and
    a semi-transmission reflecting layer disposed on an upper surface of the fluorescent resin,
    wherein a length of the semi-transmission reflecting layer of one of the plurality of LEDs along a first direction is shorter than a distance between two LED dies of two adjacent LEDs of the plurality of LEDs, the two adjacent LEDs being arranged in the first direction.

2. The light source according to claim 1, wherein the semi-transmission reflecting layer of each of the plurality of LEDs is a metal reflecting layer.

3. The light source according to claim 1, wherein each of the plurality of LEDs further comprises a sub-mount substrate on which the LED die is mounted.

4. The light source according to claim 3, wherein, for each of the plurality of LEDs, a length of the semi-transmission reflecting layer along the first direction is the same as a length of the sub-mount substrate along the first direction.

5. The light source according to claim 1, wherein, for each of the plurality of LEDs, a part of light emitted from the LED die is reflected by the semi-transmission reflecting layer and exits from side surfaces of the fluorescent resin.

6. The light source according to claim 1, wherein, for each of the plurality of LEDs, the semi-transmission reflecting layer contacts the upper surface of the fluorescent resin.

7. The light source according to claim 1, further comprising a reflecting sheet arranged with the plurality of LEDs in the first direction, wherein the reflecting sheet includes a plurality of holes, and wherein upper portions of the LEDs pass through the holes of the reflecting sheet and protrude beyond the reflecting sheet.

8. The light source according to claim 7, wherein, for each of the plurality of LEDs, the fluorescent resin is not arranged with the reflecting sheet in a second direction from the fluorescent resin toward the semi-transmission reflecting layer, and the semi-transmission reflecting layer is not arranged with the reflecting sheet in the second direction.

9. A backlight comprising:
    a mount substrate;
    a plurality of LEDs disposed above the mount substrate; and
    a diffusion plate covering the LEDs with a gap provided between the diffusion plate and the LEDs,
    wherein each of the LEDs comprises
        a LED die,
        a fluorescent resin contacting the LED die, and
        a semi-transmission reflecting layer disposed on an upper surface of the fluorescent resin, and
    wherein a length of the semi-transmission reflecting layer of one of the plurality of LEDs along a first direction is shorter than a distance between two LED dies of two adjacent LEDs of the plurality of LEDs, the two adjacent LEDs being arranged in the first direction.

10. The backlight according to claim 9, further comprising a reflecting sheet disposed above the mount substrate such that an upper surface of each of the plurality of LEDs is positioned higher than an upper surface of the reflecting sheet.

* * * * *